(12) United States Patent
Sugibuchi et al.

(10) Patent No.: US 8,699,494 B2
(45) Date of Patent: Apr. 15, 2014

(54) IMAGE TRANSFER APPARATUS, METHOD, AND COMPUTER READABLE MEDIUM

(75) Inventors: Hiroki Sugibuchi, Kanagawa (JP); Manabu Akamatsu, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 72 days.

(21) Appl. No.: 13/557,316

(22) Filed: Jul. 25, 2012

(65) Prior Publication Data

US 2013/0182553 A1 Jul. 18, 2013

(30) Foreign Application Priority Data

Jan. 12, 2012 (JP) ................................ 2012-004210

(51) Int. Cl.
*H04L 12/28* (2006.01)

(52) U.S. Cl.
USPC ............ 370/392; 370/466; 714/748; 714/758

(58) Field of Classification Search
USPC ................................................. 714/748, 758
See application file for complete search history.

(56) References Cited

U.S. PATENT DOCUMENTS 6,065,144 A * 5/2000 Knoch ........................... 714/724
2008/0196073 A1 * 8/2008 Tango et al. .................. 725/109
2009/0234795 A1 * 9/2009 Haas et al. ........................ 707/1
2010/0058134 A1 * 3/2010 Matsui ........................... 714/748
2011/0194604 A1 * 8/2011 Dei et al. .................. 375/240.12
2012/0331193 A1 * 12/2012 Abe .............................. 710/106

FOREIGN PATENT DOCUMENTS

JP 09-321750 A 12/1997
JP 2007-233993 A 9/2007

* cited by examiner

*Primary Examiner* — Duc C Ho
(74) *Attorney, Agent, or Firm* — Sughrue Mion, PLLC

(57) ABSTRACT

An image transfer apparatus includes a generator, a scrambling device, first and second converters, a descrambling device, a detector, and a retransmission request unit. The generator generates packets each having an error detecting code added to image data. The scrambling device scrambles the generated packets on a packet-to-packet basis to reduce repetition of identical data. The first converter subjects the scrambled packets to parallel-to-serial conversion, and transfers the packets to a target apparatus. The second converter receives the scrambled packets from the target apparatus, and subjects the received packets to serial-to-parallel conversion. The descrambling device descrambles the packets subjected to the serial-to-parallel conversion. The detector detects an error from the error detecting code of each of the descrambled packets. Upon detection of the error, the retransmission request unit requests the target apparatus to retransmit the packet in which the error is detected.

4 Claims, 3 Drawing Sheets

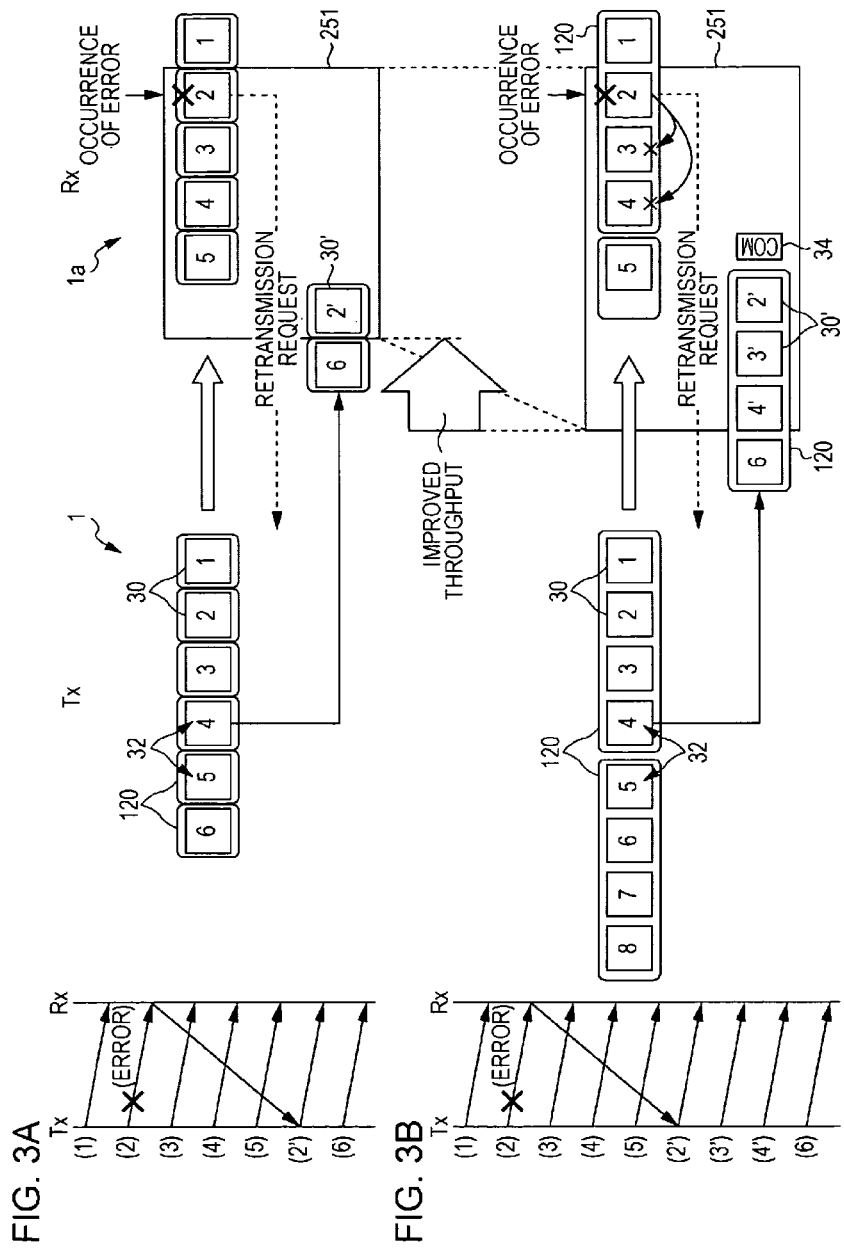

US 8,699,494 B2

IMAGE TRANSFER APPARATUS, METHOD, AND COMPUTER READABLE MEDIUM

CROSS-REFERENCE TO RELATED APPLICATIONS

This application is based on and claims priority under 35 USC 119 from Japanese Patent Application No. 2012-004210 filed Jan. 12, 2012.

BACKGROUND (i) Technical Field

The present invention relates to an image transfer apparatus, an image transfer method, and a computer readable medium.

(ii) Related Art

Recently, high-speed serial transfer systems (serial transmission systems), such as serial advanced technology attachment (SATA), serial attached SCSI (SAS), PCI Express, and USB 3.0, which are faster than parallel transfer systems have been used.

In high-speed serial transfer systems, to prevent crosstalk or electromagnetic radiation caused by a state in which many peaks of energy occur in a specific frequency, data to be transmitted is scrambled, and received data is descrambled. In the scrambling, data is permuted so that the same data does not repeatedly appear.

SUMMARY

According to an aspect of the invention, there is provided an image transfer apparatus including a generator, a scrambling device, a first converter, a second converter, a descrambling device, a detector, and a retransmission request unit. The generator generates packets. Each of the packets has an error detecting code which is added to image data. The scrambling device scrambles the packets generated by the generator, on a packet-to-packet basis in order to reduce repetition of identical data. The first converter subjects the packets obtained through the scrambling to conversion from parallel data into serial data, and transfers the packets obtained through the conversion to a target apparatus. The second converter receives the packets which have been transferred from the target apparatus and which are obtained through the scrambling, and subjects the received packets to conversion from serial data into parallel data. The descrambling device descrambles the packets which have been subjected to the conversion into parallel data by the second converter. The detector detects an error on the basis of the error detecting code of each of the packets obtained through the descrambling. When the detector detects the error, the retransmission request unit requests the target apparatus to retransmit the packet in which the error is detected.

BRIEF DESCRIPTION OF THE DRAWINGS

Exemplary embodiments of the present invention will be described in detail based on the following figures, wherein:

FIG. 3A is a diagram for explaining operations according to the first exemplary embodiment, and FIG. 3B is a diagram for explaining operations of a comparative example.

DETAILED DESCRIPTION

Figure 1:
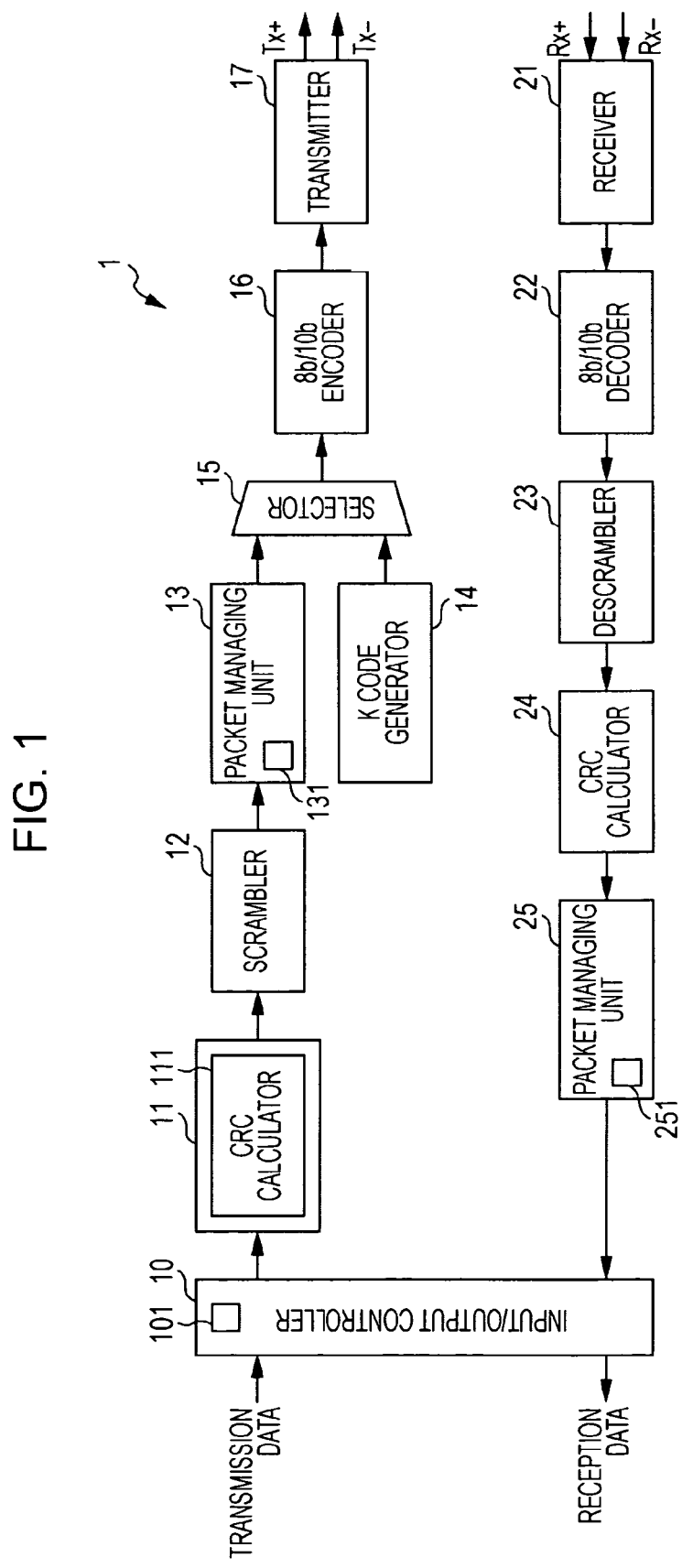
FIG. 1 is a block diagram illustrating an exemplary configuration of an image transfer apparatus according to a first embodiment of the present invention.

Exemplary embodiments of the present invention will be described below with reference to the drawings. Components having substantially the same function are denoted by the same reference numeral in the figures, and repeated description will be avoided.

First Exemplary Embodiment

Figure 2:
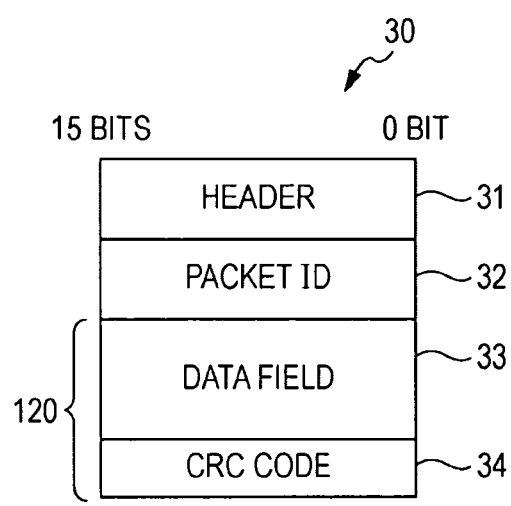
FIG. 2 is a diagram illustrating an exemplary configuration of a packet structure.

FIG. 1 is a block diagram illustrating an exemplary configuration of an image transfer apparatus according to a first embodiment of the present invention. FIG. 2 is a diagram illustrating an exemplary configuration of a packet structure.

As illustrated in FIG. 1, an image transfer apparatus 1 includes an input/output controller 10 which has a buffer memory 101 and which controls input/output of image data. On the transmission side of the input/output controller 10, the image transfer apparatus 1 also includes a packet generator 11 having a CRC calculator 111, a scrambler 12, a packet managing unit 13 having a buffer memory 131, a K code generator 14, a selector 15, an 8b/10b encoder 16, and a transmitter 17. On the reception side of the input/output controller 10, the image transfer apparatus 1 also includes a receiver 21, an 8b/10b decoder 22, a descrambler 23, a CRC calculator 24, and a packet managing unit 25 having a buffer memory 251.

The image transfer apparatus 1 is connected to a target apparatus through a transmission cable having a pair of differential signal lines Tx+/Tx− and a pair of differential signal lines Rx+/Rx−. The target apparatus has a configuration similar to that of the image transfer apparatus 1, and will not be described. In FIG. 1, an example is illustrated in which a transmission cable has one lane, but the transmission cable may have multiple lanes.

The input/output controller 10 is an exemplary retransmission request unit. The scrambler 12 is an exemplary scrambling device. The packet managing unit 13 on the transmission side is an exemplary generator. The transmitter 17 is an exemplary first converter. The receiver 21 is an exemplary second converter. The descrambler 23 is an exemplary descrambling device. The packet managing unit 25 on the reception side is an exemplary detector.

The input/output controller 10, which controls input/output of image data, stores image data which has been transferred to a target apparatus, i.e., transmitted data, as data for reproduction in the buffer memory 101 until receiving a positive acknowledgement (ACK) from the target apparatus. The input/output controller 10 also controls, for example, the packet generator 11 to transmit an ACK, when data is normally received, or a negative acknowledgement (NAK) as a reception response to a target apparatus in accordance with the presence/absence of a CRC error which is detected by the packet managing unit 25.

The packet generator 11 adds a CRC code obtained through cyclic redundancy check (CRC) calculation performed by the CRC calculator 111 on image data to be transferred, i.e., transmission data, to the image data, and generates a packet. As illustrated in FIG. 2, a packet 30 is constituted by a header 31, a packet ID 32 of 16 bits which is used for identifying the packet 30, a data field 33 constituted by image data having a large number of bits, for example, 512 bits, and a CRC code 34 in the final form. When a retransmission request is received from a target apparatus, the packet generator 11 generates a retransmission packet in which a CRC code 34 is added to image data to be retransferred, under the control of the input/output controller 10. The data field 33 and the CRC code 34 illustrated in FIG. 2 are included in a scrambled unit 120 which is subjected to scrambling. The scrambled unit may include all pieces of the data constituting the packet, or may include only the image data. The CRC code 34 is an exemplary error detecting code.

The scrambler 12 scrambles each of the packets of transmission data. The scrambling may be achieved through a linear feedback shift register (LFSR) using a polynomial, for example, $G(X)=X^{16}+X^{15}+X^{13}+X^4+1$.

The packet managing unit 13 temporarily stores the packet 30 which has been subjected to the scrambling in the buffer memory 131, and then adds a header 31 and a packet ID 32 to the packet 30. The packet managing unit 13 also adds a header indicating retransmission to a retransmission packet.

The selector 15 receives the packet 30 through a first input terminal thereof, and receives a K code through a second input terminal thereof. The selector 15 selects reception of a packet 30 during normal operation, and selects reception of a K code, for example, when a header is to be inserted and effective data is not to be transmitted. The 8b/10b encoder 16 then receives the output from the selector 15.

The 8b/10b encoder 16 performs encoding in which conversion from 8 bits into 10 bits is performed.

The transmitter 17 converts parallel data (packet) into serial data, and transmits the resulting data to a target apparatus through the differential signal lines Tx+/Tx− in the transmission cable.

The receiver 21 converts serial data (packet) received through the differential signal lines Rx+/Rx− in the transmission cable into parallel data.

The 8b/10b decoder 22 performs decoding in which conversion from 10 bits into 8 bits is performed.

The descrambler 23 performs a reverse process of the scrambling, i.e., descrambling, on each of the packets of reception data. The descrambling may be achieved by using a configuration similar to that of the scrambler 12.

The CRC calculator 24 calculates a CRC code for the descrambled data.

The packet managing unit 25 extracts image data from the received packet 30, and also detects the presence/absence of a CRC error on the basis of the calculation result obtained from the CRC calculator 24. When the packet managing unit 25 detects a CRC error, the packet managing unit 25 instructs the input/output controller 10 to request retransmission of the packet which causes the CRC error.

Operation of First Exemplary Embodiment

Now, exemplary operations according to the first exemplary embodiment will be described with reference to FIGS. 3A and 3B. FIG. 3A is a diagram for explaining operations according to the first exemplary embodiment, and FIG. 3B is a diagram for explaining operations of a comparative example. The description of the operations will be made for the case where the image transfer apparatus 1 is applied to a multi-function device, i.e., an image forming apparatus, which has multiple functions, such as scanning, copying, printing, and faxing, and where an image which is read from a source document with the scanner in the image forming apparatus is transferred from a controller to an image output unit. The source and the destination of the transfer are not limited to a controller and an image output unit.

Now, operations according to the first exemplary embodiment will be described with reference to FIG. 3A. When the input/output controller 10, which is a controller, receives image data which is read from a source document, as transmission data, the packet generator 11 adds, to the image data, a CRC code obtained through CRC calculation performed by the CRC calculator 111 on the image data to be transferred, and generates a packet.

The scrambler 12 scrambles each of the packets of transmission data. The packet managing unit 13 attaches a header 31 and a packet ID 32 to the scrambled packet, so that the packet 30 in the final form is generated. The 8b/10b encoder 16 subjects the packet 30 to the conversion from 8 bits into 10 bits, and the transmitter 17 subjects the packet 30 to the conversion from parallel data to serial data. The resulting packet 30 is transmitted through serial communication to an image output unit of a target apparatus 1a via the differential signal lines Tx+/Tx− of the transmission cable.

The packet 30 which has been transferred through serial communication to the target apparatus 1a is subjected to the conversion from serial data into parallel data by the receiver 21, and is subjected to the conversion from 10 bits into 8 bits by the 8b/10b decoder 22. The descrambler 23 descrambles the reception data, and the CRC calculator 24 calculates a CRC code for the reception data.

The packet managing unit 25 extracts image data from the received packet, and also detects the presence/absence of a CRC error on the basis of the calculation result obtained by the CRC calculator 24. As illustrated in FIG. 3A, assume that packets 30 indicated by packet IDs "1" to "6" are transmitted through serial communication to the image output unit of the target apparatus 1a, and that an error occurs in the packet indicated by the packet ID "2". The packet managing unit 25 of the target apparatus 1a detects the CRC error in the packet indicated by the packet ID "2", and instructs the input/output controller 10 to transmit retransmission request.

The input/output controller 10 of the image transfer apparatus 1 outputs image data which corresponds to the packet ID "2" from the image data stored in the buffer memory 101 to the packet generator 11 which generates a packet 30' as described above. The scrambler 12 scrambles the packet 30', and the packet managing unit 13 adds a header indicating retransmission to the packet 30'. The resulting packet 30' is transmitted to the target apparatus 1a. A packet ID "2'" indicates the packet 30' which has been retransmitted. In the case illustrated in FIG. 3A, the packets up to the packet ID "5" have been normally transmitted. Accordingly, following the packet 30' indicated by the packet ID "2'", a packet 30 indicated by a packet ID "6" is transmitted.

COMPARATIVE EXAMPLE

Now, a comparative example will be described with reference to FIG. 3B. In the comparative example, the scrambling is performed for each group of four packets. FIG. 3B illustrates a state in which a group of the packets 30 indicated by packet IDs "1" to "4" is scrambled and a group of the packets 30 indicated by packet IDs "5" to "8" is scrambled on the transmission side. The buffer memory 251 on the reception side stores the scrambled packets 30. When the packet managing unit 25 on the reception side detects an error in the packet indicated by the packet ID "2", the input/output controller 10 transmits a retransmission request to the controller. In the case where an error occurs in the packet 30 indicated by the packet ID "2", the error influences the packets 30 which are indicated by the packet IDs "3" and "4" and which follow the packet 30 indicated by the packet ID "2", and the packets 30 indicated by the packet IDs "3" and "4" as well as the packet 30 indicated by the packet ID "2" are therefore discarded. The packets 30' indicated by packet IDs "2'", "3'", and "4'" are retransmitted from the transmission side. Since the packet which is indicated by the packet ID "5" and which is stored in the buffer memory 251 has been normally received, the packet 30 indicated by a packet ID "6" follows the packet indicated by the packet ID "4'". A group of the packets indicated by the packet IDs "2'", "3'", "4'", and "6" is scrambled to be retransmitted. A COM 34 in FIG. 3B is a symbol, i.e., a K code, for synchronization.

Effect of First Exemplary Embodiment

According to the first exemplary embodiment, the scrambling is performed for each packet, achieving improvement in retransmission efficiency of packets in comparison with the case where a group of multiple packets is scrambled. In the case illustrated in FIGS. 3A and 3B, the throughput is increased by two packets. In addition, it is possible to reduce the memory size of the buffer memory 251 on the reception side.

Second Exemplary Embodiment

According to a second exemplary embodiment (not illustrated), the following components of the image transfer apparatus 1 illustrated in FIG. 1 are provided for each of multiple colors, e.g., yellow (Y), magenta (M), cyan (C), black (K): the packet generator 11, the scrambler 12, the packet managing unit 13, the K code generator 14, the selector 15, the 8b/10b encoder 16, and the transmitter 17 on the transmission side; and the receiver 21, the 8b/10b decoder 22, the descrambler 23, the CRC calculator 24, and the packet managing unit 25 on the reception side. Image data transferred by this image transfer apparatus is image data for each of the colors of Y, M, C, and K.

The scrambler 12 provided for each of the colors performs the scrambling by using an initial value which is different from those used by other scramblers 12.

According to the second exemplary embodiment, it is possible to reduce crosstalk and electromagnetic radiation.

The present invention is not limited to the above-described exemplary embodiments. Various modifications may be made and embodied as long as the gist of the present invention is not modified. For example, a part or the entirety of the configuration of the image transfer apparatus 1 may be achieved by using a hardware circuit, such as a field programmable gate array (FPGA) or an application specific integrated circuit (ASIC). Alternatively, a part or the entirety of the configuration may be achieved in such a manner that a central processing unit (CPU) operates in accordance with programs.

Some of the components according to the exemplary embodiments of the present invention need not be provided as long as the gist of the present invention is not modified. In addition, programs used in the above-described exemplary embodiments may be stored and provided in a recording medium such as a compact disc-read-only memory (CD-ROM).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image transfer apparatus comprising:
   a generator that generates packets, each of the packets having an error detecting code which is added to image data;
   a scrambling device that scrambles the packets generated by the generator, on a packet-to-packet basis in order to reduce repetition of identical data;
   a first converter that subjects the packets obtained through the scrambling to conversion from parallel data into serial data and that transfers the packets obtained through the conversion to a target apparatus;
   a second converter that receives the packets which have been transferred from the target apparatus and which are obtained through the scrambling and that subjects the received packets to conversion from serial data into parallel data;
   a descrambling device that descrambles the packets which have been subjected to the conversion into parallel data by the second converter;
   a detector that detects an error on the basis of the error detecting code of each of the packets obtained through the descrambling; and
   a retransmission request unit that, when the detector detects the error, requests the target apparatus to retransmit the packet in which the error is detected.

2. The image transfer apparatus according to claim 1, wherein the image data is a piece of image data for each of a plurality of colors, and
   the scrambling device performs the scrambling for each of the plurality of colors by varying an initial value for the scrambling.

3. A non-transitory computer readable medium storing a program causing a computer to execute a process comprising:
   generating packets, each of the packets having an error detecting code which is added to image data;
   scrambling the generated packets on a packet-to-packet basis in order to reduce repetition of identical data;
   descrambling the packets obtained through the scrambling;
   detecting an error on the basis of the error detecting code of each of the packets obtained through the descrambling; and
   when the error is detected, requesting retransmission of the packet in which the error is detected.

4. An image transfer method comprising:
   generating packets, each of the packets having an error detecting code which is added to image data;
   scrambling the generated packets on a packet-to-packet basis in order to reduce repetition of identical data;
   descrambling the packets obtained through the scrambling;
   detecting an error on the basis of the error detecting code of each of the packets obtained through the descrambling; and
   when the error is detected, requesting retransmission of the packet in which the error is detected.

* * * * *